US011866807B2

(12) United States Patent
Suzuki et al.

(10) Patent No.: US 11,866,807 B2
(45) Date of Patent: Jan. 9, 2024

(54) ALUMINUM ALLOY PIPE AND METHOD OF PRODUCING THE SAME

(71) Applicants: UACJ Corporation, Tokyo (JP); UACJ EXTRUSION CORPORATION, Tokyo (JP)

(72) Inventors: Taichi Suzuki, Tokyo (JP); Kiyotake Sawa, Aichi (JP); Shuhei Shakudo, Tokyo (JP)

(73) Assignee: UACJ Corporation; UACJ EXTRUSION CORPORATION, Tokyo (JP)

( * ) Notice: Subject to any disclaimer, the term of this patent is extended or adjusted under 35 U.S.C. 154(b) by 489 days.

(21) Appl. No.: 17/290,564

(22) PCT Filed: Apr. 24, 2020

(86) PCT No.: PCT/JP2020/017675
§ 371 (c)(1),
(2) Date: Apr. 30, 2021

(87) PCT Pub. No.: WO2020/218502
PCT Pub. Date: Oct. 29, 2020

(65) Prior Publication Data
US 2021/0355566 A1 Nov. 18, 2021

(30) Foreign Application Priority Data
Apr. 26, 2019 (JP) .................................. 2019-085116

(51) Int. Cl.
*C22C 21/06* (2006.01)
*C23C 4/08* (2016.01)
*C22C 21/08* (2006.01)
*C21D 8/10* (2006.01)

(52) U.S. Cl.
CPC ................ *C22C 21/08* (2013.01); *C21D 8/10* (2013.01); *C23C 4/08* (2013.01)

(58) Field of Classification Search
CPC .................................. C22C 21/06; C23C 4/08
See application file for complete search history.

(56) References Cited

U.S. PATENT DOCUMENTS

| | | |
|---|---|---|
| 2003/0084569 A1 | 5/2003 | Hyogo et al. |
| 2015/0060035 A1 | 3/2015 | Furumura et al. |
| 2018/0073119 A1 | 3/2018 | Suzuki et al. |
| 2019/0099841 A1 | 4/2019 | Narita et al. |
| 2019/0344318 A1 | 11/2019 | Nakaura et al. |
| 2020/0190635 A1 | 6/2020 | Suzuki et al. |

FOREIGN PATENT DOCUMENTS

| | | |
|---|---|---|
| CN | 1932428 A | 3/2007 |
| CN | 101928861 A | 12/2010 |
| CN | 107414229 A | 12/2017 |
| CN | 108884521 A | 11/2018 |
| JP | 2003053523 A | 2/2003 |
| JP | 2003-226928 A | 8/2003 |
| JP | 2010-085066 A | 4/2010 |
| JP | 2016-003802 A | 1/2016 |
| JP | 2018-091526 A | 6/2018 |
| JP | 2018-204078 A | 12/2018 |
| WO | 2013155934 A1 | 10/2013 |
| WO | 2016/159361 A1 | 10/2016 |

OTHER PUBLICATIONS

Team, Gabrian. "6063 Aluminum: Get to Know Its Properties and Uses—Gabrian." Gabrian, May 27, 2021, www.gabrian.com/6063-aluminum-properties.*
Original and English Translation of Chinese Office Action for corresponding Chinese Application No. 202080006058.0 dated Sep. 28, 2022.
International Search Report for corresponding International Patent Application No. PCT/JP2020/017675, dated Jun. 30, 2020.

* cited by examiner

*Primary Examiner* — Jessee R Roe
(74) *Attorney, Agent, or Firm* — Renner, Otto, Boisselle & Sklar, LLP

(57) ABSTRACT

An aluminum alloy pipe includes a pipe body portion made of an Al—Mg series alloy that includes Mg at a concentration equal to or higher than 0.7 mass % and lower than 2.5 mass % and Ti at a concentration higher than 0 mass % and equal to or lower than 0.15 mass %, with the balance being Al and unavoidable impurities, and a Zn-containing layer being outside the pipe body portion and including Zn being diffused in the Al—Mg series alloy at a concentration equal to or higher than 0.1 mass %.

7 Claims, 3 Drawing Sheets

FIG.3

|  | COMPOSITION (MASS %) | | | | |
| --- | --- | --- | --- | --- | --- |
|  | Si | Fe | Mg | Ti | Al |
| ALLOY A | 0.04 | 0.12 | 1.03 | 0.01 | BALANCE |

FIG.4

|  | Zn DEPOSITION AMOUNT (g/m$^2$) | THICKNESS OF Zn-CONTAINING LAYER ($\mu$m) | HARDNESS IMPROVEMENT Hv(5), CONVERSION INTO % | EVALUATION |
| --- | --- | --- | --- | --- |
| EXAMPLE 1 | 10 | 100 | +86% | ○ |
| EXAMPLE 2 | 18 | 150 | +95% | ○ |
| COMPARATIVE EXAMPLE 1 | 0 | 0 | +0% | × |

ALUMINUM ALLOY PIPE AND METHOD OF PRODUCING THE SAME

This application is a national phase of International Patent Application No. PCT/JP2020/017675 filed Apr. 24, 2020, which claims priority to Japanese Application No. 2019-085116, filed Apr. 26, 2019, the entire disclosures of which are hereby incorporated by reference.

TECHNICAL FIELD

The technology disclosed herein relates to an aluminum alloy pipe having high strength used for piping for a heat exchanger or hose joints and a method of producing such an aluminum alloy pipe.

BACKGROUND ART 5000 series (Al—Mg series or Al—Mg—Mn series) aluminum alloys have been known. The Al—Mg series aluminum alloys have superior material characteristics in strength and corrosion resistance than 1000 series (pure aluminum series) aluminum alloys, 3000 series (Al—Mn series) aluminum alloys, and 6000 series (Al—Mg—Si series) aluminum alloys. However, the 5000 series aluminum alloys have high hardness and therefore, have low extrusion properties. Patent Document 1 discloses a 5000 series aluminum alloy hollow pipe having excellent processability while maintaining certain good extrusion properties by adjusting alloy components to be used, work hardening coefficient (n value), or a cross-sectional shape of the extruded pipe.

The aluminum alloy hollow pipe disclosed in Patent Document 1 is produced by the porthole extrusion, for example, and has excellent bending processing properties. The content of Mg in the aluminum alloy hollow pipe needs to be increased to achieve higher strength; however, this may require increased extrusion pressure and the producing by the porthole extrusion may be difficult.

RELATED ART DOCUMENT

Patent Document 1: Japanese Unexamined Patent Application Publication No. 2018-204073

PROBLEM TO BE SOLVED BY THE INVENTION

An object of the technology described herein is to provide a 5000 series aluminum alloy pipe having good extrusion properties and increased strength and a method of producing such a 5000 series aluminum alloy pipe.

DISCLOSURE OF THE PRESENT INVENTION

Means for Solving the Problem

As a result of the intensive research performed by the inventors, the inventors found that strength can be increased by providing a Zn-containing layer of high strength outside an extruded pipe. The extruded pipe is obtained by extruding adjusted alloy components and Sn is sprayed to the extruded pipe with a predefined Zn deposition amount in a predefined area. Then, the obtained extruded pipe is subjected to diffusing heat treatment to provide the Zn-containing layer. Thus, the inventors have reached the present invention. It is assumed that the strength is increased in the Zn containing layer because Zn diffused in the Al—Mg series alloy and solid solution Mg in the mother phase produce fine $MgZn_2$ precipitate.

The technology (1) described in the specification provides an aluminum alloy pipe for a heat exchanger including a pipe body portion made of an Al—Mg series alloy that includes Mg at a concentration equal to or higher than 0.7 mass % and lower than 2.5 mass % and Ti at a concentration higher than 0 mass % and equal to or lower than 0.15 mass %, with the balance being Al and unavoidable impurities, and a Zn-containing layer included in an outer surface portion of the pipe body portion and including Zn being diffused in the Al—Mg series alloy at a concentration equal to or higher than 0.1 mass %.

The technology (2) described in the specification provides the aluminum alloy pipe according to (1) in which the Zn-containing layer has a thickness that is equal to or greater than 50 μm.

The technology (3) described in the specification provides the aluminum alloy pipe according to (1) or (2) in which the Zn-containing layer has Vickers hardness that is 50% higher or more than that of the pipe body portion.

The technology (4) described in the specification provides a method of producing an aluminum alloy pipe including a hot extrusion process including extruding an Al—Mg series alloy including Mg at a concentration equal to or higher than 0.7 mass % and lower than 2.5 mass % and Ti at a concentration higher than 0 mass % and equal to or lower than 0.15 mass %, with the balance being Al and unavoidable impurities by hot extrusion and obtaining a tubular pipe, and a Zn-containing layer forming process including forming a Zn-containing layer on an outer surface of the tubular pipe, the Zn-containing layer including Zn being diffused in the Al—Mg series alloy at a concentration equal to or higher than 0.1 mass %.

The technology (5) described in the specification provides the method according to (4) in which the hot extrusion process is performed with porthole extrusion.

The technology (6) described in the specification provides the method according to (4) or (5) in which the Zn-containing layer forming process includes a Zn-spraying process of spraying Zn to the tubular pipe and obtaining a Zn-sprayed pipe having Zn deposition to the outer surface of the tubular pipe, and a diffusing heat treatment process of performing diffusing heat treatment to the Zn-sprayed pipe and forming the Zn-containing layer outside a pipe body portion made of the Al—Mg series alloy.

The technology (7) described in the specification provides the method according to (6) in which a deposition amount of Zn with respect to the Zn-sprayed pipe is equal to or more than 2 g/m² and equal to or less than 30 g/m².

Advantageous Effect of the Invention

According to the technology described herein, a 5000 series aluminum alloy pipe having good extrusion properties and high strength can be provided.

BRIEF DESCRIPTION OF THE DRAWINGS

FIG. 3 is a table illustrating components included in an aluminum alloy.

FIG. 4 is a table illustrating evaluation results.

MODES FOR CARRYING OUT THE INVENTION

Embodiment

Figure 1:
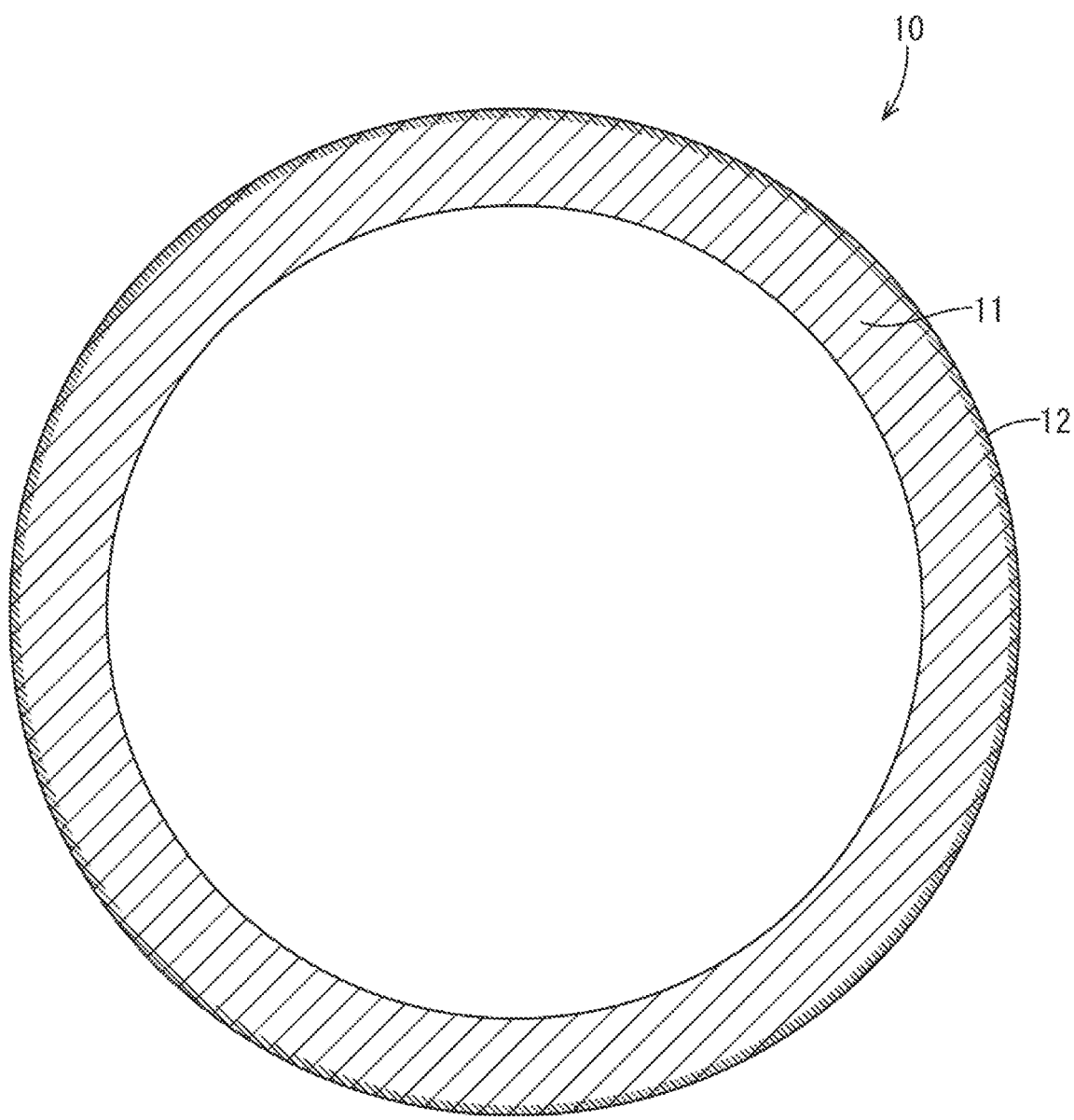
FIG. 1 is a cross-sectional view illustrating a configuration of an aluminum alloy pipe according to one embodiment.
Figure 2:
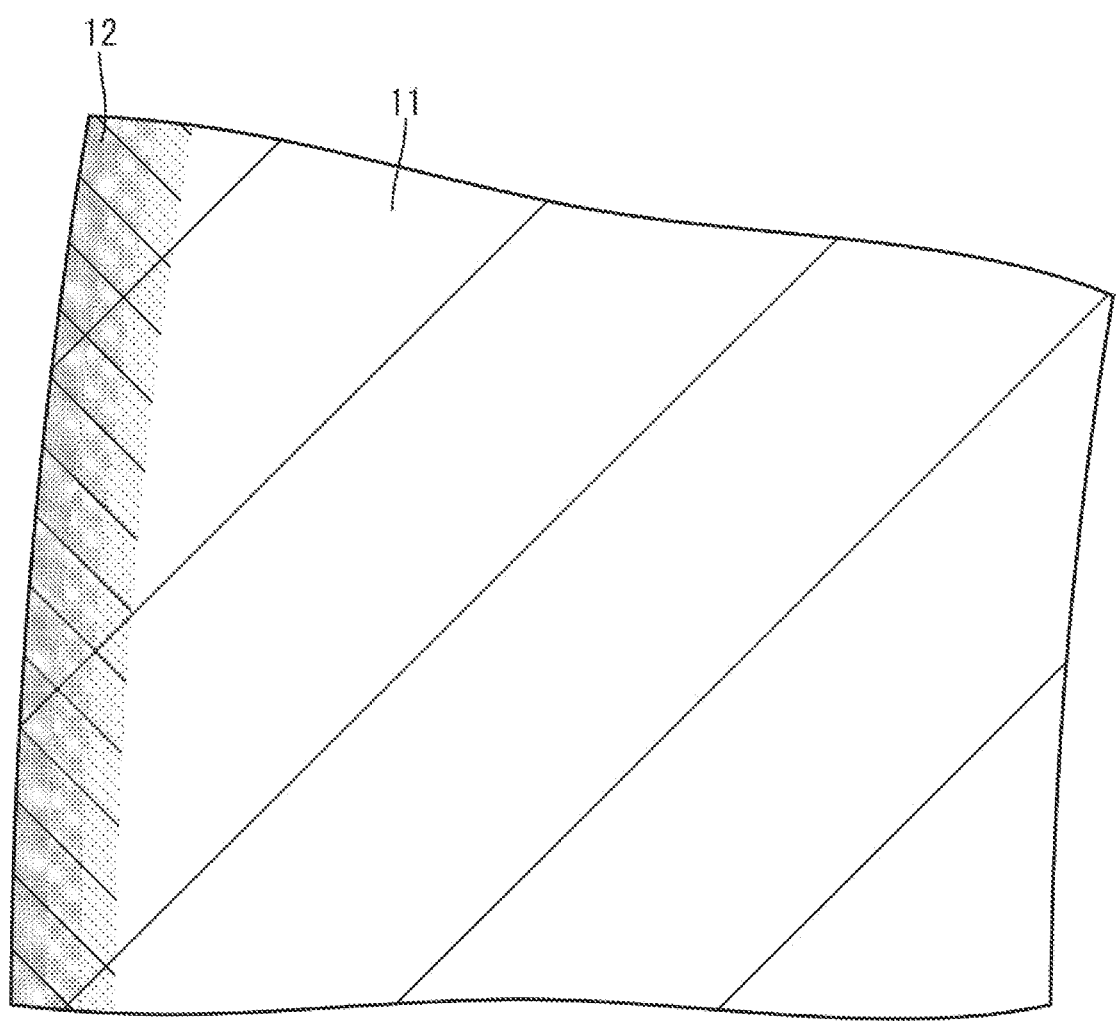
FIG. 2 is an enlarged cross-sectional view of a portion of FIG. 1.

As illustrated in FIGS. 1 and 2, an aluminum alloy pipe 10 according to the present embodiment includes a pipe body portion 11 and a Zn-containing layer 12. The pipe body portion 11 is made of an Al—Mg series alloy that includes Mg at a concentration equal to or higher than 0.7 mass % and lower than 2.5 mass % and Ti at a concentration higher than 0 mass % and equal to or lower than 0.15 mass %, with the balance being Al and unavoidable impurities. The Zn-containing layer 12 is outside the pipe body portion 11. The Zn-containing layer 12 includes Zn at a concentration equal to or higher than 0.1 mass % and Zn is diffused in the Al—Mg series alloy.

The aluminum alloy pipe 10 according to the present embodiment is produced by processing an extrusion billet made of an aluminum alloy having a predefined composition with porthole extrusion. The aluminum alloy pipe 10 is a porthole extruded hollow pipe made of an aluminum alloy. Examples of extrusion methods of producing such an extruded pipe include a mandrel extrusion and the porthole extrusion. In the mandrel extrusion, a stem equipped with a mandrel is used to extrude a hollow billet into a circular pipe. In the porthole extrusion, extrusion is performed using a hollow die that includes in combination a male die having port holes for dividing a material and a mandrel for forming a hollow portion and a female die having a chamber for welding together the divided material in a manner surrounding the mandrel. However, an extruded pipe produced by the mandrel extrusion has problems in that, for example, uneven thickness is more likely to occur and it is difficult to mold a thin pipe. Therefore, for aluminum alloy pipes such as piping material or hose joint material, it is preferable that extruded pipes be produced by the porthole extrusion.

In the present embodiment, the aluminum alloy used for the pipe body portion 11 is an Al—Mg series alloy including a predefined content of Mg and a predefined content of Ti, with the balance being Al and unavoidable impurities.

Mg is for increasing strength and the content of Mg in the aluminum alloy used for the pipe body portion 11 is within a range equal to or higher than 0.7 mass % and lower than 2.5 mass %, and preferably within a range equal to or higher than 0.7 mass % and equal to or lower than 1.3 mass %. By setting the content of Mg in the aluminum alloy within the above range, a strength required for piping material, for example, can be obtained and also hot deformation resistance during extrusion does not increase excessively. Therefore, the pipe body portion 11 can be produced by the porthole extrusion. If the content of Mg in the aluminum alloy is lower than the above range, the strength of the aluminum alloy is equivalent to that of 1000 series alloys and strength that is generally required for piping material and is preferably 80 MPa or higher cannot be obtained. If the content of Mg is greater than the above range, the extrusion pressure during the porthole extrusion increases and this adversely affects extrudability.

Ti is included as a refiner for achieving a finer cast structure, for example. The content of Ti included in the aluminum alloy of the pipe body portion 11 is within a range higher than 0 mass % and equal to of lower than 0.15 mass % and preferably within a range equal to or higher than 0.01 mass % and equal to or lower than 0.05 mass %. If the content of Ti in the aluminum alloy is 0 mass %, that is, Ti is not contained in the aluminum alloy, the cast structure becomes coarse and heterogeneous like feathery crystals, and thus coarse crystal grains may be partially formed in the structure of the extruded hollow pipe and heterogeneous crystal grains may be formed in the structure. This lowers elongation obtained in a tensile test. If the content of Ti is more than the above range, a large crystallized product may be formed and a surface defect may occur during extrusion or a crack or a cut may be more likely to occur from the large crystallized product as a starting point during drawing, which may adversely affect the processability as a product.

The aluminum alloy used for the pipe body portion 11 may include one or two or more than two of Si, Fe, Cu, Mn, Cr and Zn in addition to Mg and Ti, as needed. In such a configuration, the content of each of the elements in the aluminum alloy is as follows. The content of Si is equal to or lower than 0.20 mass %, the content of Fe is equal to or lower than 0.20 mass %, the content of Cu is equal to or lower than 0.5 mass %, the content of Mn is equal to or lower than 0.50 mass %, the content or Cr is equal to or lower than 0.10 mass %, and the content of Zn is equal to or lower than 0.10 mass %.

If the Si content in the aluminum alloy exceeds 0.20 mass %, an Mg—Si compound is excessively formed, whereby the corrosion resistance is reduced. If the Fe content in the aluminum alloy exceeds 0.20 mass %, an $Al_3Fe$ compound excessively precipitated, whereby the corrosion resistance is decreased. If the Cu content in the aluminum alloy exceeds 0.5 mass %, the corrosion resistance is decreased.

Precipitation is likely to proceed in Mn during the extrusion. Like the 3000 series aluminum alloys or the Al—Mg—Mn series 5000 aluminum alloys, if the Mn content in the aluminum alloy exceeds 0.50 mass % and excessive precipitation proceeds in the welded portion during the porthole extrusion, potential difference is caused between the welded portion and another portion. This may accelerate corrosion along the welded portion and such corrosion results in penetration holes in a short period and corrosion resistance is adversely affected. Therefore, among the 5000 series aluminum alloys, the Al—Mg series aluminum alloys are preferably used for the aluminum alloy of the pipe body portion 11. In the present embodiment, the Al—Mg series aluminum alloys used for the pipe body portion 11 do not contain Mn and contain a predefined content of Mg. The corrosion is not accelerated since precipitation does not proceed in Mg during the extrusion. Good corrosion properties are exerted in a salt-water condition since the used Al—Mg series aluminum alloy is a 5000 series alloy.

If the Cr content in the aluminum alloy exceeds 0.10 mass %, Cr has a heterogeneous crystal grain structure including mixture of a recrystallization structure and fiber structure because Cr suppresses the recrystallization after the extrusion, and thus the uniform deformation processability as a product is decreased. If the Zn content in the aluminum alloy used for the pipe body portion 11 exceeds 0.10 mass %, general corrosion proceeds and the amount of corrosion increases, whereby the corrosion resistance is reduced.

Other impurities other than Si, Fe, Cu, Mn, Cr, and Zn described above may be contained within a range that does not affect the effects of the technology described herein. The content of each of the other impurities may be 0.05 mass % or lower and the total content thereof may be 0.15 mass % or lower.

As illustrated in FIGS. 1 and 2, the aluminum alloy pipe 10 according to the present embodiment includes the Zn-containing layer 12 containing Zn at a concentration equal to or hither than 0.1 mass % being mixed in the aluminum alloy of the pipe body portion 11. In each of the drawings, a scale of some components may be altered for easy description of the components. The Zn-containing layer 12 is outside the pipe body portion 11. However, a border between the pipe body portion 11 and the Zn-containing layer 12 is not necessarily clear. The Zn content in the aluminum alloy may gradually increase from the pipe body portion 11 having the Zn content of 0.10 mass % or lower toward the outer surface of the aluminum alloy pipe 10 and the aluminum alloy pipe 10 may include the Zn-containing layer 12 having the Zn content of 0.1 mass % or higher at an outermost surface of the aluminum alloy pipe 10.

The aluminum alloy pipe 10 including the Zn-containing layer 12 is produced with a method including a hot extrusion process and a Zn-containing layer forming process. In the hot extrusion process, the aluminum alloy for the pipe body portion 11 is extruded by the hot extrusion such as the porthole extrusion to obtain a tubular pipe. In the Zn-containing layer forming process, the Zn-containing layer 12 is formed on the outer surface of the obtained tubular pipe. The Zn-containing layer forming process with which the Zn-containing layer 12 is formed includes a Zn-spraying process and a diffusing heat treatment process. In the Zn-spraying process, Zn is sprayed to the outer surface of the tubular pipe obtained in the hot extrusion process to obtain a Zn-sprayed pipe having Zn deposition to the outer surface thereof. In the diffusing heat treatment process, the Zn-sprayed pipe is subjected to the diffusing heat treatment.

In the Zn-spraying process, the Zn-sprayed pipe including a Zn deposition amount of 2 g/m$^2$ or more and 30 g/m$^2$ or less on outer surface of the tubular pipe is preferably obtained. If the Zn deposition amount is less than 2 g/m$^2$, the improvement in strength becomes small. The speed of spraying needs to be extremely decreased to increase the Zn deposition amount to more than 30 g/m$^2$ and this may greatly lower productivity.

After the Zn-spraying process, the diffusing heat treatment process is performed. If the diffusing heat treatment process is not performed after the Zn-spraying process, the diffusion of Zn into the material may be insufficient and desired improvement of hardness may not be obtained. The thickness of the Zn-containing layer 12 after the diffusing heat treatment process is preferably equal to or greater than 50 μm. The thickness of the Zn-containing layer 12 is more preferably equal to or greater than 100 μm, and further more preferably equal to or greater than 150 μm. The greatest thickness of the Zn-containing layer is preferably 300 μm or smaller to suppress extreme lowering of the productivity caused by providing the Zn-containing layer. As described before, the extruded object containing Mg and extruded by the porthole extrusion is subjected to the Zn-spraying process and the diffusing heat treatment process under predefined conditions. By performing such processes, hardness of an inner portion of the obtained object that is 50 μm away from the outer surface is increased by 50% compared to that of an object that is not subjected to the Zn-spraying process. Therefore, a 5000 series aluminum alloy pipe having high strength can be provided without increasing the Mg content. To achieve the above effect, the conditions of the diffusing heat treatment process are as follows. The temperature is preferably 350° C. to 560° C. and the time duration is preferably 0.5 hour to 12 hours. If the thickness of the Zn-containing layer 12 is smaller than 50 μm or if the hardness improvement efficiency is less than 50%, a ratio of the thickness of the Zn-containing layer 12 to the entire thickness of the pipe or the hardness improvement efficiency is lowered and the improvement of the strength is small.

The embodiment will be specifically described with Examples; however, the embodiment is not limited to Examples described below.

EXAMPLES

Examples and Comparative Example

An aluminum alloy A having a composition given in Table in FIG. 3 was melted and casted into an ingot in a billet shape having a diameter of 90 mm by continuous casting. After the obtained billet was homogenized at 500° C. for eight hours, extrusion was performed on the resulting billet at a temperature of 450° C. into a pipe shape having an outer diameter of 8 mm and a thickness of 1 mm. Right after the extrusion (without being cooled down), the Zn-spraying is performed to the extruded pipe and the resulting pipe was cooled down to a room temperature and subjected to the diffusing heat treatment at a temperature of 450° C. for four hours. In the above procedure, the conditions of the Zn-spraying process were varied and two aluminum alloy pipes having different Zn deposition amounts were obtained.

Evaluation Methods

Zn Deposition Amount

The surface of the pipe before the diffusing heat treatment was analyzed by an X-ray fluorescence spectrometer to obtain the Zn deposition amount. As illustrated in Table in FIG. 4, the pipe of Example 1 contains the Zn deposition amount of 10 g/m$^2$ before the diffusing heat treatment and the pipe of Example 2 contains the Zn deposition amount of 1.18 g/m$^2$ before the diffusing heat treatment. An aluminum alloy pipe according to Comparative Example 1 was not subjected to the Zn-spraying and the diffusing heat treatment.

Thickness of Zn-Containing Layer

Each of the aluminum alloy pipes of Example 1 and Example 2 after the diffusing heat treatment and the aluminum alloy pipe of Comparative Example 1 was analyzed by an EPMA. Especially, the analysis was made for the thickness of each pipe with respect to a cross section ranging from the outer periphery to the inner periphery to obtain a thickness of the Zn-containing layer of each pipe. The depth dimension at which the Zn content of 0.1 mass % or more is detected is defined as the thickness of the Zn-containing layer.

Hardness Improvement

Vickers hardness (JIS Z 2244) was measured at a depth position of 50 μm (with respect to a cross section) from the outer surface of each of the aluminum alloy pipes of Example 1, Example 2, and Comparative Example 1. The hardness improvement after the diffusing heat treatment process is calculated by dividing a hardness increased value by a value representing hardness of each pipe obtained without being subjected to the Zn-spraying.

Evaluation Results

The hardness improvement was evaluated as good (o) if the obtained value is 50% or more and evaluated as bad (×)

if the obtained value is less than 50%. According to the evaluation results in Table in FIG. 4, the aluminum alloy pipe of Example 1 includes the Zn-containing layer of a thickness of 100 μm and the aluminum alloy pipe of Example 2 includes the Zn-containing layer of a thickness of 150 μm, and the aluminum alloy pipes of Example 1 and Example 2 achieve 50% or more of the hardness improvement.

The aluminum alloy pipe of Comparative Example 1 that is not subjected to the Zn-spraying does not include the Zn-containing layer and no improvement is achieved in the hardness.

As described before, the aluminum alloy pipe 10 according to the present embodiment is an aluminum alloy pipe for a heat exchanger and includes the pipe body portion 11 and the Zn-containing layer 12. The pipe body portion 11 is made of an Al—Mg series alloy that includes Mg whose content is equal to or greater than 0.7 mass % and less than 2.5 mass % and Ti whose content is greater than 0 mass % and 0.15 mass % or less, with the balance being Al and unavoidable impurities. The Zn-containing layer 12 is outside the pipe body portion 11. The Zn-containing layer 12 includes Zn diffused in the Al—Mg series alloy and the content of Zn is 0.1 mass % or more.

According to the above configuration, the aluminum alloy pipe 10 includes the Zn-containing layer 12 having high strength on an outer side of the pipe body portion 11 that is made of Al—Mg series alloy having good extrusion properties and therefore, the hardness of the aluminum alloy pipe 10 can be improved without deteriorating the extrusion properties during the hot extrusion. It is assumed that the strength is increased in the Zn containing layer 12 because Zn diffused in and mixed with the Al—Mg series alloy and solid solution Mg in the mother phase produce fine $MgZn_2$ precipitate. Such an aluminum alloy pipe 10 can be preferably used as a pipe for a heat exchanger.

The thickness of the Zn-containing layer 12 of the aluminum alloy pipe 10 according to the present embodiment is 50 μm or more. According to such a configuration, the aluminum alloy pipe 10 includes the Zn-containing layer 12 of high strength with a sufficient thickness on the outer side of the pipe body portion 11. This improves strength of the aluminum alloy pipe 10. If the thickness of the Zn-containing layer 12 is smaller than 50 μm, the ratio of the high strength layer to the whole aluminum alloy pipe 10 is low and sufficient improvement in the strength cannot be obtained. The thickness of the Zn-containing layer 12 is preferably 100 μm or more, and more preferably 150 μm or more. The thickness of the Zn-containing layer 12 is preferably 200 μm or less to suppress extreme lowering of the productivity caused by providing the Zn-containing layer 12.

In the aluminum alloy pipe 10 according to the present embodiment, Vickers hardness of the Zn-containing layer 12 is 50% higher or more than that of the pipe body portion 11. According to such a configuration, the aluminum alloy pipe 10 includes the Zn-containing layer 12 having higher Vickers hardness than the pipe body portion 11 on the outer side of the pipe body portion 11. This sufficiently improves the strength of the aluminum alloy pipe 10 as a whole.

The method of producing the aluminum alloy pipe 10 according to the present embodiment includes the hot extrusion process and the Zn-containing layer forming process. In the hot extrusion process, an Al—Mg series alloy including Mg at a concentration equal to or higher than 0.7 mass % and lower than 2.5 mass % and Ti at a concentration higher than 0 mass % and equal to or lower than 0.15 mass %, with the balance being Al and unavoidable impurities is extruded by the hot extrusion to obtain a tubular pipe. In the Zn-containing layer forming process, the Zn-containing layer 12 including Zn that is diffused in the Al—Mg series alloy at a concentration equal to or higher than 0.1 mass % is formed on the outer surface of the obtained tubular pipe. The Zn-containing layer 12 having high strength is formed on the outer surface of the tubular pipe after the extrusion and therefore, the strength of the produced aluminum alloy pipe 10 can be improved without deteriorating processability during the hot extrusion.

In the method of producing the aluminum alloy pipe 10 according to the present embodiment, the hot extrusion process is performed with the porthole extrusion. Accordingly, the obtained pipe is less likely to have an uneven thickness and a thin pipe can be formed.

In the method of producing the aluminum alloy pipe 10 according to the present embodiment, the Zn-containing layer forming process includes the Zn-spraying process and the diffusing heat treatment process. In the Zn-spraying process, Zn is sprayed to the pipe obtained in the hot extrusion process to obtain a Zn-sprayed pipe having Zn deposition to the outer surface of the pipe. In the diffusing heat treatment process, the Zn-sprayed pipe is subjected to the diffusing heat treatment to form the Zn-containing layer 12 outside the pipe body portion 11 made of the Al—Mg series alloy. The Zn deposited to the surface of the pipe in the Zn-spraying process is subjected to the diffusing heat treatment and diffused toward a center of the pipe such that Zn is diffused within the aluminum alloy and an intermetallic compound may be created. As a result, the Zn-containing layer 12 with high strength is obtained outside the pipe body portion 11 made of the Al—Mg series alloy and the strength of the aluminum alloy pipe 10 is improved.

In the method of producing the aluminum alloy pipe 10 according to the present embodiment, the Zn deposition amount with respect to the Zn-sprayed pipe is equal to or more than 2 $g/m^2$ and equal to or less than 30 $g/m^2$. Accordingly, sufficient strength improvement can be obtained while keeping good productivity.

Other Embodiments

The technology disclosed in this specification is not limited to the embodiment described in the above and the drawings but the embodiment may be altered as appropriate.

(1) In the above embodiment, the Zn-spraying process and the diffusing heat treatment process are performed after the hot extrusion process to produce the aluminum alloy pipe; however, the method is not limited to include the above processes. Other process such as bending, elongation processing, and cold processing may be performed between the hot extrusion process and the Zn-spraying process or between the Zn-spraying process and the diffusing heat treatment process. For example, the aluminum alloy pipe according to the present technology described herein can be produced by performing the Zn-spraying process, a drawing process, and the diffusing heat treatment process sequentially after the hot extrusion processor performing the drawing process, the Zn-spraying process, and the diffusing heat treatment process sequentially after the hot extrusion process. The bending process may be performed as a product after the hot extrusion process and the Zn-spraying process and the diffusing heat treatment process may be performed after the bending process.

(2) In the above embodiment, as illustrated in FIG. 1, the aluminum alloy pipe 10 is a smooth inner surface pipe that has a smooth inner surface; however, the configuration of the aluminum alloy pipe is not limited to the above one. For example, the present technology can be applied to a pipe having an inner surface with an uneven shape such as grooves or recesses.

EXPLANATION OF SYMBOLS

10: aluminum alloy pipe, 11: pipe body portion, 12: Zn-containing layer

The invention claimed is:

1. An aluminum alloy pipe comprising:
   a pipe body portion made of an Al—Mg series alloy that includes Mg at a concentration equal to or higher than 0.7 mass % and lower than 2.5 mass % and Ti at a concentration higher than 0 mass % and equal to or lower than 0.15 mass %, with the balance being Al and unavoidable impurities; and
   a Zn-containing layer being outside the pipe body portion and including Zn being diffused in the Al—Mg series alloy at a concentration equal to or higher than 0.1 mass %.

2. The aluminum alloy pipe according to claim 1, wherein the Zn-containing layer has a thickness that is equal to or greater than 50 μm.

3. The aluminum alloy pipe according to claim 1, wherein the Zn-containing layer has Vickers hardness that is 50% higher or more than that of the pipe body portion.

4. A method of producing an aluminum alloy pipe comprising:
   a hot extrusion process including extruding an Al—Mg series alloy including Mg at a concentration equal to or higher than 0.7 mass % and lower than 2.5 mass % and Ti at a concentration higher than 0 mass % and equal to or lower than 0.15 mass %, with the balance being Al and unavoidable impurities by hot extrusion and obtaining a tubular pipe; and
   a Zn-containing layer forming process including forming a Zn-containing layer on an outer surface of the tubular pipe, the Zn-containing layer including Zn being diffused in the Al—Mg series alloy at a concentration equal to or higher than 0.1 mass %.

5. The method according to claim 4, wherein the hot extrusion process is performed with porthole extrusion.

6. The method according to claim 4, wherein the Zn-containing layer forming process includes
   a Zn-spraying process of spraying Zn to the tubular pipe and obtaining a Zn-sprayed pipe having Zn deposition to the outer surface of the tubular pipe, and
   a diffusing heat treatment process of performing diffusing heat treatment to the Zn-sprayed pipe and forming the Zn-containing layer outside a pipe body portion made of the Al—Mg series alloy.

7. The method according to claim 6, wherein a deposition amount of Zn with respect to the Zn-sprayed pipe is equal to or more than 2 $g/m^2$ and equal to or less than 30 $g/m^2$.

* * * * *